(12) United States Patent
Lai

(10) Patent No.: US 6,622,430 B1
(45) Date of Patent: Sep. 23, 2003

(54) FLOWERPOT

(76) Inventor: Yuan-Song Lai, No. 32, Fuyi Rd., Taiping City, Taichung County (TW)

( * ) Notice: Subject to any disclaimer, the term of this patent is extended or adjusted under 35 U.S.C. 154(b) by 0 days.

(21) Appl. No.: 10/171,990

(22) Filed: Jun. 17, 2002

(51) Int. Cl.[7] ............................................. A01G 25/00
(52) U.S. Cl. ........................................................ 47/79
(58) Field of Search ................................. 47/79, 65.5

(56) References Cited

U.S. PATENT DOCUMENTS

| | | | | |
|---|---|---|---|---|
| 650,614 A | * | 5/1900 | Roeseler | 47/79 |
| 1,343,114 A | * | 6/1920 | Colson | 47/79 |
| 4,148,155 A | * | 4/1979 | Allen | 119/77 |
| 4,161,844 A | * | 7/1979 | Hentschel et al. | 47/48.5 |
| 4,446,652 A | * | 5/1984 | Anderson | 47/67 |
| 4,553,352 A | * | 11/1985 | Powell et al. | 220/571 |
| 4,962,613 A | * | 10/1990 | Nalbandian | 47/71 |
| 5,042,197 A | * | 8/1991 | Pope | 47/71 |
| 5,058,319 A | * | 10/1991 | Liao | 47/79 |
| 5,272,835 A | * | 12/1993 | Stern | 47/79 |
| 5,315,783 A | * | 5/1994 | Peng | 47/31.1 |
| 5,644,868 A | * | 7/1997 | Lui | 47/79 |
| 5,806,242 A | * | 9/1998 | Park | 47/79 |
| 5,896,701 A | * | 4/1999 | Schaerer | 206/815 |
| 5,921,025 A | * | 7/1999 | Smith | 47/48.5 |
| 6,276,090 B1 | * | 8/2001 | Lai | 47/79 |
| 6,279,265 B1 | * | 8/2001 | Scannell, Jr. | 47/79 |
| 6,345,470 B1 | * | 2/2002 | Slaght et al. | 47/79 |
| 6,363,658 B1 | * | 4/2002 | Lai | 119/246 |

* cited by examiner

Primary Examiner—Charles T. Jordan
Assistant Examiner—Jordan M Lofdahl
(74) Attorney, Agent, or Firm—Rosenberg, Klein & Lee

(57) ABSTRACT

A flowerpot is constructed to include a pot body having a plurality of upright ventilation tubes adapted for guiding in outside fresh air and guiding out excessive amount of water accumulated in the pot body, a perforated ventilation filter mounted in the pot body above the upright ventilation tubes and adapted for carrying soil for raising plants, the ventilation filter having a perforated hollow center leg supported on the bottom wall of the pot body for the passing of air and water from the pot body into gaps in the soil carried on the ventilation filter.

4 Claims, 5 Drawing Sheets

FLOWERPOT

BACKGROUND OF THE INVENTION

1. Field of the Invention

The present invention relates to flowerpots and, more particularly, to a flowerpot, which automatically supplies water to the soil in the pot body, and automatically carries off excessive amount of rainwater.

2. Description of the Related Art

FIG. 1 shows a flowerpot according to the prior art. This structure of flowerpot comprises a pot body 10', the pot body 10' having air holes 11' in the bottom wall thereof, and a ventilation filter 12' mounted in the pot body 10' and adapted for carrying soil for raising plants. The ventilation filter 12' comprises a bottom center leg 14' supported on the-bottom wall of the pot body 10', air vents 13' for ventilation of air. This structure of flowerpot is still not satisfactory in function. One drawback of this structure of flowerpot is that the pot body 10' cannot accumulate water because the air holes 11' quickly carries off water from the pot body 10'. Another drawback of this structure of flowerpot is that the flowerpot has no means to automatically supply water to the soil carried on the ventilation filter 12'.

SUMMARY OF THE INVENTION

The present invention has been accomplished to provide a flowerpot, which eliminates the aforesaid drawbacks. According to one aspect of the present invention, the flowerpot comprises a pot body having a plurality of upright ventilation tubes adapted for guiding in outside fresh air and guiding out excessive amount of water accumulated in the pot body, a perforated ventilation filter mounted in the pot body above the upright ventilation tubes and adapted for carrying soil for raising plants, the ventilation filter having a perforated hollow center leg supported on the bottom wall of the pot body for the passing of air and water from the pot body into gaps in the soil carried on the ventilation filter. According to another aspect of the present invention, a perforated ventilation tube is embedded in the soil carried on the ventilation filter and connected to one upright ventilation tube of the pot body for guiding air into gaps in the soil.

DETAILED DESCRIPTION OF THE PREFERRED EMBODIMENT

Figure 1A:
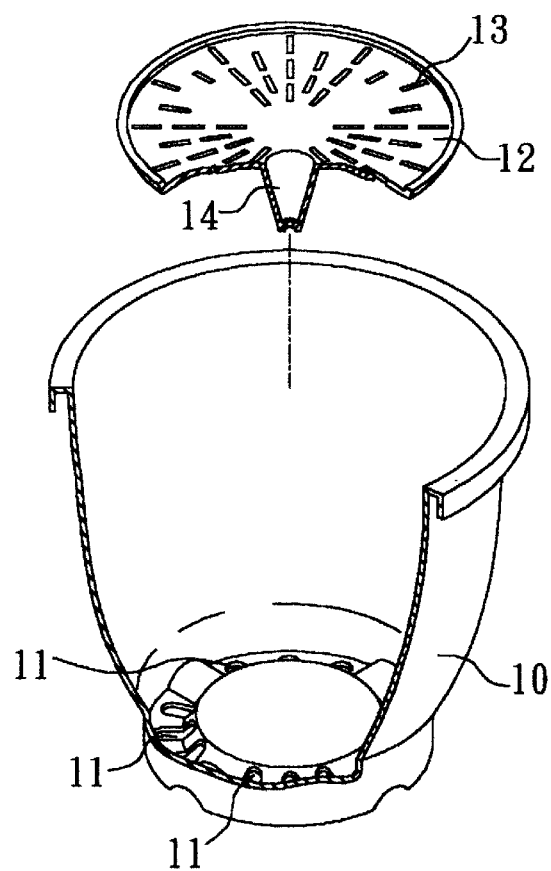
FIG. 1A is an exploded, sectional elevational view of a flowerpot according to the prior art.
Figure 1B:
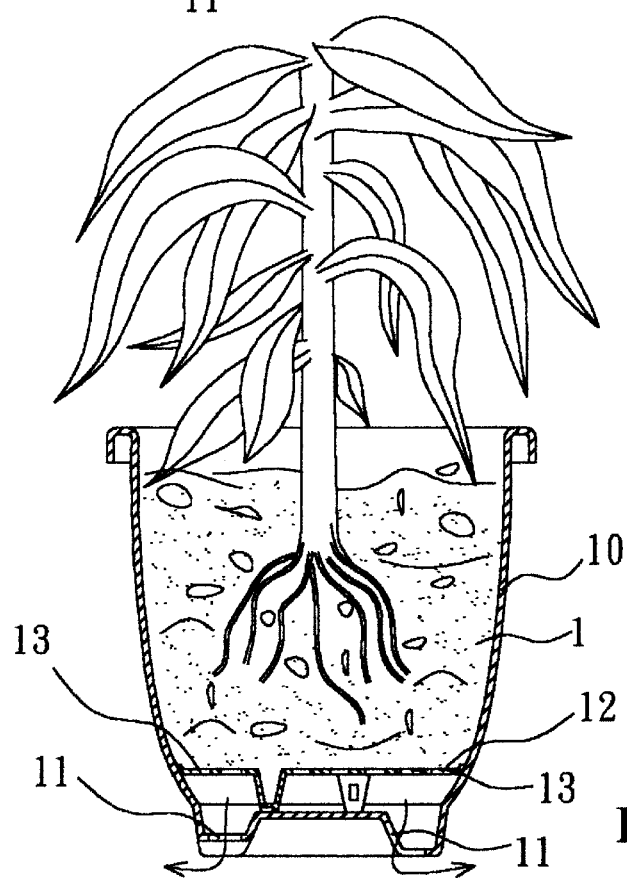
FIG. 1B is a schematic drawing showing an application example of the prior art flowerpot.
Figure 2:
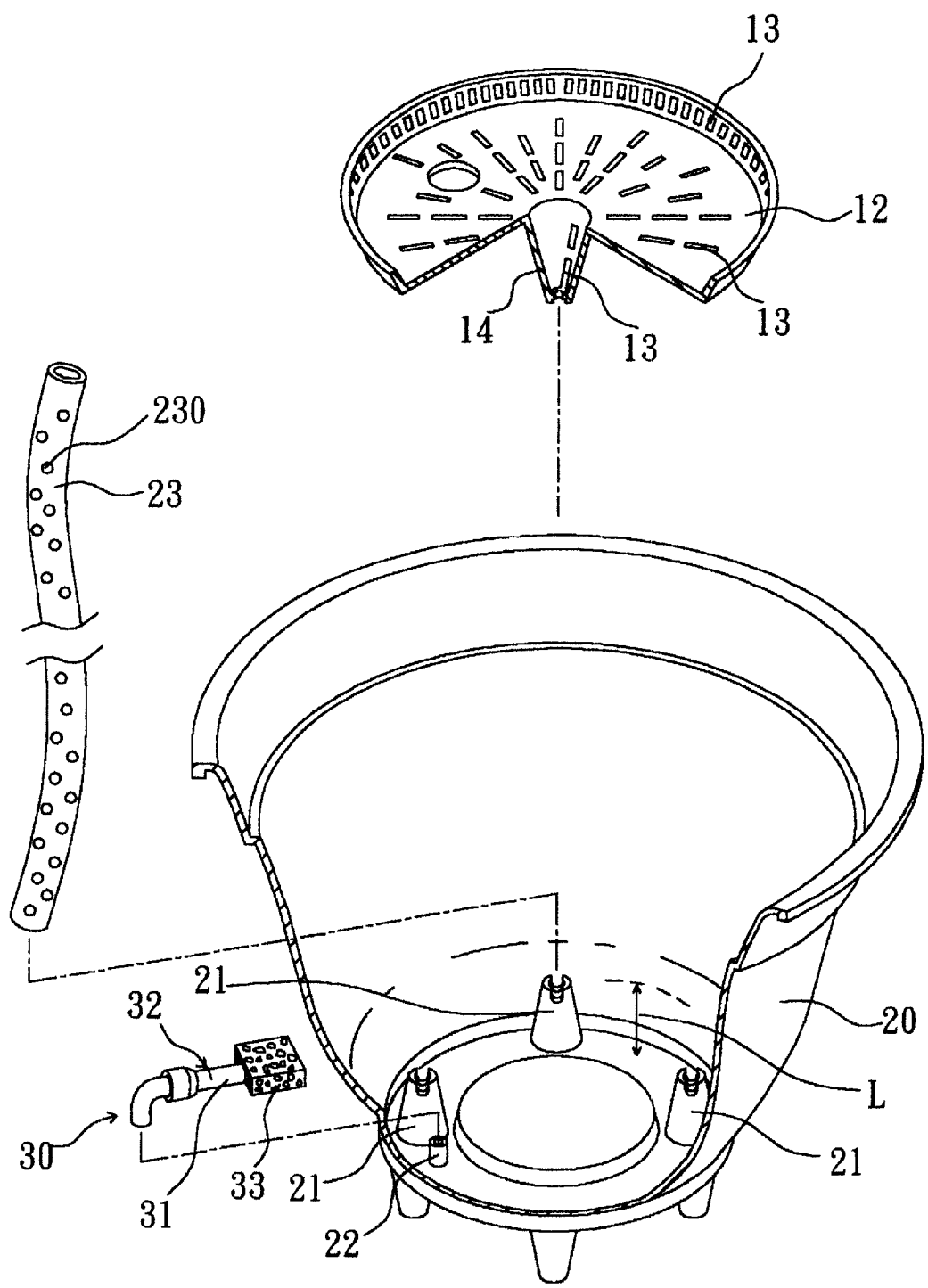
FIG. 2 is an exploded, sectional elevational view of a flowerpot according to the present invention.
Figure 3A:
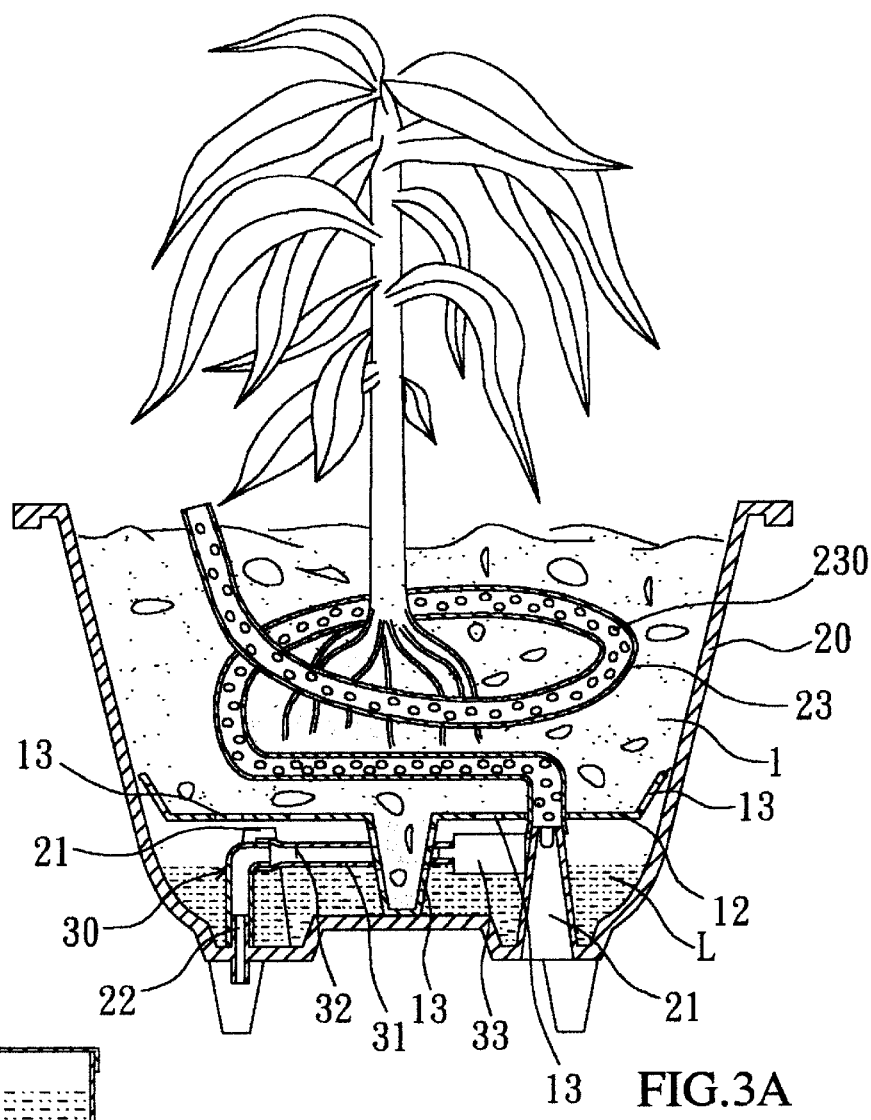
FIG. 3A is a schematic sectional view of the present invention showing the water control device closed.
Figure 3B:
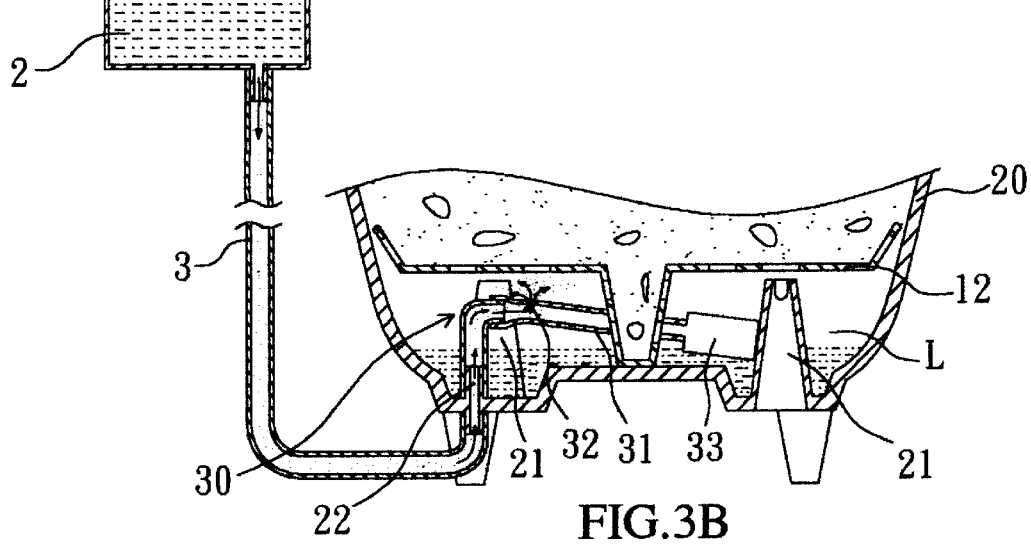
FIG. 3B is a schematic sectional view of the present invention showing the water control device opened.

Referring to FIGS. 2, 3A, and 3B, a flowerpot in accordance with the present invention is shown comprising a pot body 20. A perforated ventilation filter 12 is mounted inside the pot body 20 to carry a certain amount of soil in the pot body 20 for raising plants. A water chamber L is defined in the pot body 20 below the ventilation filter 12. The ventilation filter 12 has a hollow center leg 14 supported on the bottom wall of the pot body 20, and pores 13 in the body thereof as well as the leg 14 for the passing of air and water from the inside of the pot body 20 to the soil carried on the ventilation filter 12.

The pot body 20 comprises a water inlet 22 adapted for guiding water from an external water source 2 through a water supply pipe 3 into the water chamber L, a plurality of upright ventilation tubes 21 formed integral with the bottom wall and suspended in the water chamber L and adapted for guiding outside fresh air into the inside of the pot body 20 and serving as overflow pipe to guide excessive amount of water out of the water chamber L. A water control device 30 is provided below the ventilation filter 12, and adapted for automatically regulating the water level in the water chamber L. The water control device 30 comprises a flexible split tube 31 connected to the water inlet 22, and a float 33 fixedly connected to one end, namely, the free end of the flexible split tube 31 remote from the water inlet 22. The flexible split tube 31 has a longitudinal split 32. The float 33 moves with the water level in the water chamber L below the ventilation filter 12. When the water level in the water chamber L dropped below a predetermined low level, the float 33 is lowered with the water level, and the flexible split tube 31 is turned downwards to open the split 32 for enabling water to pass from the water source 2 and the water supply pipe 3 into the water chamber L. When the water level in the water chamber L surpassed a predetermined high level, the float 33 is lifted with the water level, and the flexible split tube 31 is turned upwards to close the split 32 again. Further, a supplementary ventilation tube 23 is embedded in the soil carried on the ventilation filter 12, having one end connected to one upright ventilation tube 21 of the pot body 20 and the other end extended out of the top surface of the soil carried on the ventilation filter 12. The supplementary ventilation tube 23 has air holes 230 evenly distributed in the periphery for guiding outside fresh air into gaps in the soil carried on the ventilation filter 12.

Referring to FIGS. 3A and 3B, the water inlet 22 is connected to the external water source 2 through the water supply pipe 3 for guiding water from the water source 2 into the water chamber L, and the When the water level in the water chamber L dropped below a predetermined low level, the float 33 is lowered with the water level, and the water control device 30 automatically controls the supply of water to the water chamber L. When water low, the flexible split tube 31 is turned downwards to open the split 32 for enabling water to pass from the water source 2 and the water supply pipe 3 into the water chamber L (see FIG. 3B). On the contrary, when water high, the float 33 is lifted with the water level, and the flexible split tube 31 is turned upwards to close the split 32 again (see FIG. 3A). Further, because the supplementary ventilation tube 23 is embedded in the soil carried on the ventilation filter 12, fresh air is guided into gaps in the soil.

Figure 4:
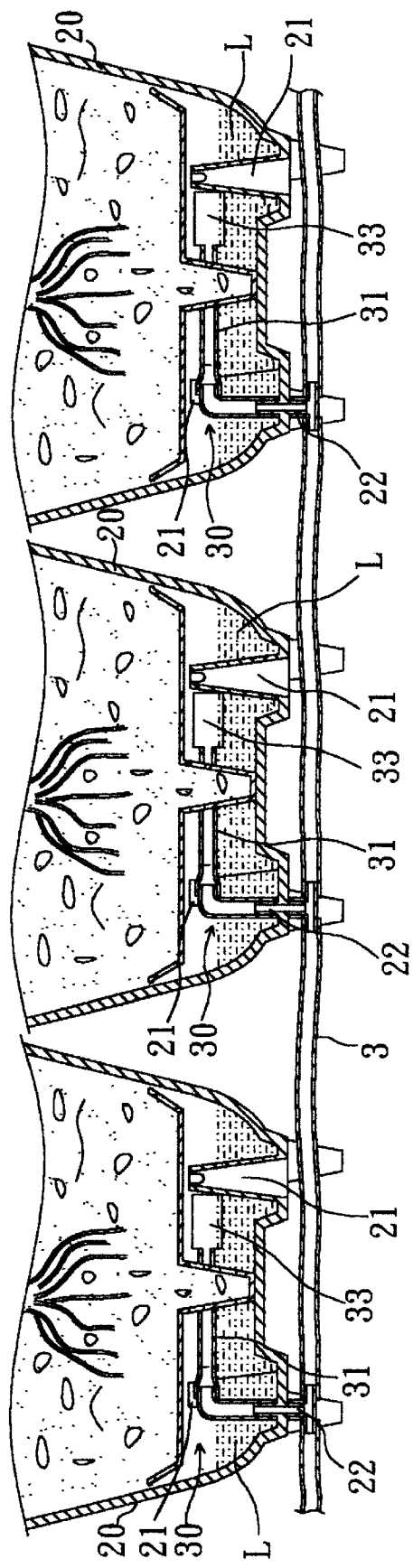
FIG. 4 illustrates a plurality of flowerpots connected in parallel to a common water supply pipe according to the present invention.

Referring to FIG. 4, when multiple flowerpots are arranged together, the water inlets 22 of the flowerpots can be connected in parallel to the water supply pipe 3 to receive water from the water supply pipe 3.

Figure 5A:
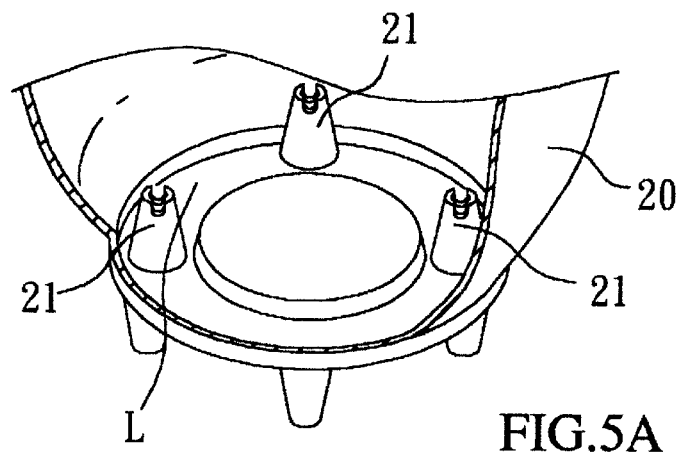
FIG. 5A is a sectional elevational view of a part of an alternate form of the flowerpot according to the present invention.
Figure 5B:
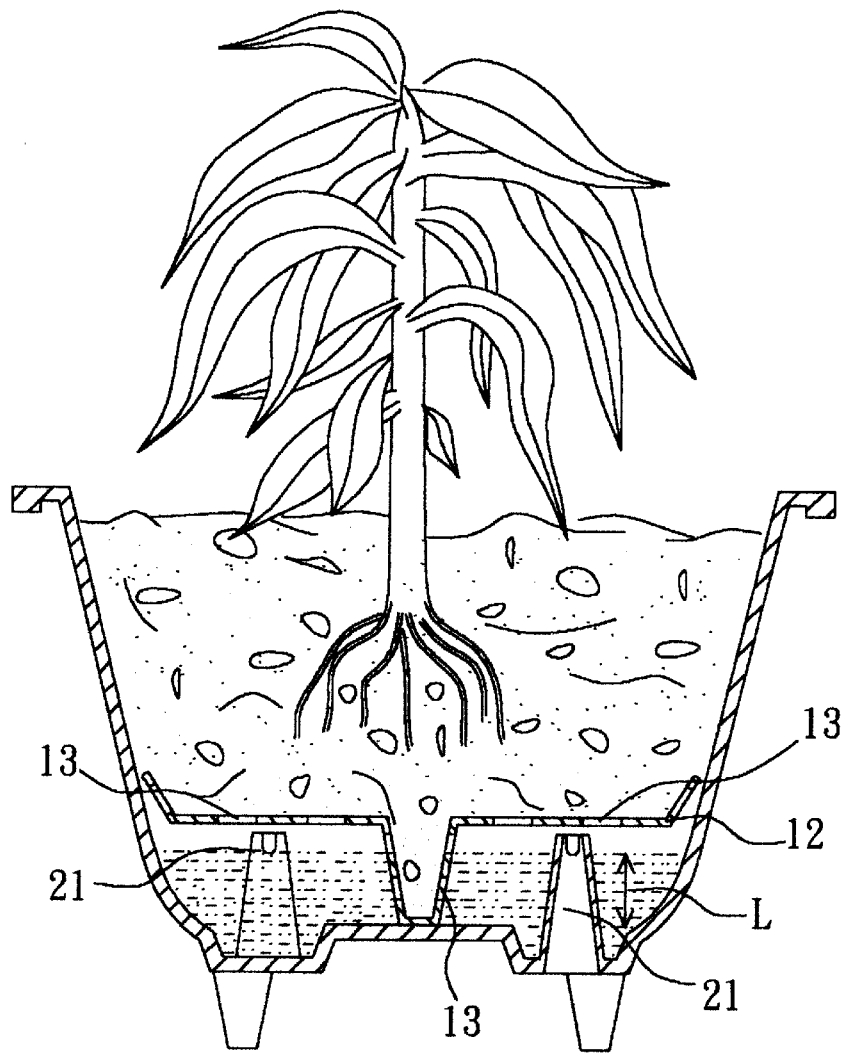
FIG. 5B is schematic sectional view showing an application example of the flowerpot of FIG. 5A.

FIGS. 5A and 5B show an alternate form of the present invention. This alternate form eliminates the aforesaid water inlet 22, water control device 30 and supplementary ventilation tube 23. The ventilation tubes 21 control the maximum water lever in the water chamber L below the ventilation filter 12.

A prototype of double-layer flowerpot has been constructed with the features of FIGS. 2~5B. The flowerpot functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A flowerpot comprising:

a pot body having a bottom wall;

a perforated ventilation filter mounted in said pot body and adapted for carrying soil in said pot body for raising plants, said ventilation filter having a hollow center leg supported on the bottom wall of said pot body and pores for the passing of air and water from said pot body below said ventilation filter into gaps in the soil carried on said ventilation filter, wherein said pot body comprises a plurality of upright ventilation tubes integral with the bottom wall thereof and spaced below said ventilation filter and adapted for guiding outside fresh air into the inside of said pot body and the soil carried on said ventilation filter through the pores of said ventilation filter and for guiding out excessive amount of water from the space inside said pot body below said ventilation filter when the water level of water accumulated in the space inside said pot body below said ventilation filter surpasses the topmost edges of said upright ventilation tube;

a water control device disposed within the space inside said pot body below said ventilation filter for automatically regulating the water level therein; and, a water inlet formed in the bottom wall of said pot body and connected to an external water source for guiding water into the space inside said pot body below said ventilation filter, said water control device being connected to said water inlet and adapted for controlling the level of water in the space inside said pot body below said ventilation filter within a predetermined range.

2. A flowerpot comprising:

a pot body having a bottom wall; and, a perforated ventilation filter mounted in said pot body and adapted for carrying soil in said pot body for raising plants, said ventilation filter having a hollow center leg supported on the bottom wall of said pot body and pores for the passing of air and water from said pot body below said ventilation filter into gaps in the soil carried on said ventilation filter, wherein said pot body comprises a plurality of upright ventilation tubes integral with the bottom wall thereof and spaced below said ventilation filter and adapted for guiding outside fresh air into the inside of said pot body and the soil carried on said ventilation filter through the pores of said ventilation filter and for guiding out excessive amount of water from the space inside said pot body below said ventilation filter when the water level of water accumulated in the space inside said pot body below said ventilation filter surpasses the topmost edges of said upright ventilation tube, a water inlet formed in the bottom wall thereof and connected to an external water source for guiding water into the space inside said pot body below said ventilation filter, and a water control device connected to said water inlet and adapted for controlling the level of water in the space inside said pot body below said ventilation filter within a predetermined range;

said water control device comprising a flexible split tube, said flexible split tube having a fixed end connected to said water inlet, a free end suspended in the space inside said pot body below said ventilation filter, and a split longitudinally disposed in the periphery thereof between said fixed end and said free end, and a float fixedly connected to the free end of said flexible split tube and floating in water in the space inside said pot body below said ventilation filter to move said flexible split tube between a first position where said flexible split tube is lifted with said float water in the space inside said pot body below said ventilation filter to close said split and a second position where said flexible split tube is lowered with said float in water in the space inside said pot body below said ventilation filter to open said split.

3. A flowerpot comprising:

a pot body having a bottom wall;

a perforated ventilation filter mounted in said pot body and adapted for carrying soil in said pot body for raising plants, said ventilation filter having a hollow center leg supported on the bottom wall of said pot body and pores for the passing of air and water from said pot body below said ventilation filter into gaps in the soil carried on said ventilation filter, wherein said pot body comprises a plurality of upright ventilation tubes integral with the bottom wall thereof and spaced below said ventilation filter and adapted for guiding outside fresh air into the inside of said pot body and the soil carried on said ventilation filter through the pores of said ventilation filter and for guiding out excessive amount of water from the space inside said pot body below said ventilation filter when the water level of water accumulated in the space inside said pot body below said ventilation filter surpasses the topmost edges of said upright ventilation tube; and, a perforated ventilation tube embedded in the soil carried on said ventilation filter and connected to one upright ventilation tube of said pot body for guiding air into gaps in the soil.

4. The flowerpot as claimed in claim 3 further comprising a water inlet formed in the bottom wall thereof and connected to an external water source for guiding water into the space inside said pot body below said ventilation filter, and a water control device connected to said water inlet and adapted for controlling the level of water in the space inside said pot body below said ventilation filter within a predetermined range.

* * * * *